United States Patent
Lepaksha et al.

(10) Patent No.: US 12,282,447 B2
(45) Date of Patent: Apr. 22, 2025

(54) EXECUTION UNIT SHARING BETWEEN PROCESSING CORES IN A CLUSTER OF A SYSTEM-ON-CHIP (SoC)

(71) Applicant: QUALCOMM Incorporated, San Diego, CA (US)

(72) Inventors: Hithesh Hassan Lepaksha, Hyderabad (IN); Sharath Kumar Nagilla, Hyderabad (IN); Darshan Kumar Nandanwar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 18/473,119

(22) Filed: Sep. 22, 2023

(65) Prior Publication Data

US 2025/0103545 A1    Mar. 27, 2025

(51) Int. Cl.
| | |
|---|---|
| *G06F 9/30* | (2018.01) |
| *G06F 9/38* | (2018.01) |
| *G06F 15/78* | (2006.01) |
| *G06F 15/80* | (2006.01) |

(52) U.S. Cl.
CPC ........ *G06F 15/7825* (2013.01); *G06F 9/3836* (2013.01); *G06F 9/3858* (2023.08); *G06F 15/7807* (2013.01); *G06F 15/8076* (2013.01)

(58) Field of Classification Search
CPC .. G06F 9/3836; G06F 9/3858; G06F 15/7807; G06F 15/7825
See application file for complete search history.

(56) References Cited

U.S. PATENT DOCUMENTS

| | | | | |
|---|---|---|---|---|
| 6,983,389 | B1* | 1/2006 | Filippo | G06F 1/3215 |
| | | | | 713/324 |
| 7,533,248 | B1* | 5/2009 | Golla | G06F 9/3877 |
| | | | | 712/214 |
| 2009/0235260 | A1 | 9/2009 | Branover et al. | |
| 2013/0097350 | A1 | 4/2013 | Ansari et al. | |
| 2017/0357513 | A1* | 12/2017 | Ayub | G06F 9/3891 |
| 2022/0083343 | A1* | 3/2022 | Kesiraju | G06F 9/3836 |
| 2024/0231900 | A1* | 7/2024 | Kamaraj | G06F 9/5005 |

OTHER PUBLICATIONS

International Search Report and Written Opinion—PCT/US2024/041827—ISA/EPO—Nov. 12, 2024.

* cited by examiner

*Primary Examiner* — Jacob Petranek
(74) *Attorney, Agent, or Firm* — QUALCOMM Incorporated

(57) ABSTRACT

A method of execution unit (EU) sharing between processor cores is described. The method includes encountering a structural hazard associated with an issued instruction in an instruction queue of a dispatch stage inside an active processor core. The method also includes issuing a request for an idle execution unit of an inactive processor core. The method further includes sending a transaction containing source operands of the issued instruction, and a word address of a result buffer as a destination operand to an allocated EU of the inactive processor core. The method also includes replacing the issued instruction in the instruction queue with a load operation to forward a result of the issued instruction from the result buffer based on the word address.

20 Claims, 9 Drawing Sheets

EXECUTION UNIT SHARING BETWEEN PROCESSING CORES IN A CLUSTER OF A SYSTEM-ON-CHIP (SoC)

BACKGROUND

Field

Aspects of the present disclosure relate to semiconductor devices and, more particularly, to execution unit sharing between processor cores in a cluster of a system-on-chip (SoC).

Background

Modern-day processors are equipped with multiple cores, which range from efficient, in-order-execution to super/hyper scalar architectures. The number of cores in these modern-day processors has steadily risen from approximately eight (8) processor cores in mobile processors to ninety-six (96) processor cores in server compute-platforms. Each processor core contains multiple integer processing units, floating point processing units, and load store units as part of their backend execution engine. During operation, some of the processor cores are under constant utilization while executing real-world applications, and some of the execution units are under constant utilization inside cores while executing the code of these real-world applications.

Execution of real-world applications involves reduced efficiency due to underutilization of processor cores and their associated execution. Unfortunately, power efficient instructions for processor core execution are unavailable. Instead, processor core efficiency is realized from early completion of specified computations and reaching an idle state for clock gating and power gating. In practice, the extra time consumed by the active processor cores to complete a computation is inefficient when there are unutilized processor cores and partially used execution engines. A solution to this inefficiency by sharing of unused execution engines with active processor cores is desired.

SUMMARY

A method of execution unit (EU) sharing between processor cores is described. The method includes encountering a structural hazard associated with an issued instruction in an instruction queue of a dispatch stage inside an active processor core. The method also includes issuing a request for an idle execution unit of an inactive processor core. The method further includes sending a transaction containing source operands of the issued instruction, and a word address of a result buffer as a destination operand to an allocated EU of the inactive processor core. The method also includes replacing the issued instruction in the instruction queue with a load operation to forward a result of the issued instruction from the result buffer based on the word address.

A method for an execution engine (EE) manager to support processor cores is described. The method includes monitoring a state of execution units (EUs) in a cluster of processor cores. The method also includes receiving a request for an idle execution unit (EU) in the cluster of processor cores, The method further includes sending a control signal to activate an allocated EU of an inactive processor core. The method also includes sending an EU acknowledgment and an EU identification (EU ID) to a dispatch stage of a requesting processor core. The method further includes sending, through an EE network-on-chip (NOC) (EE NOC), an issued instruction in an instruction queue of the dispatch stage inside an active processor core to the allocated EU.

This has outlined, broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
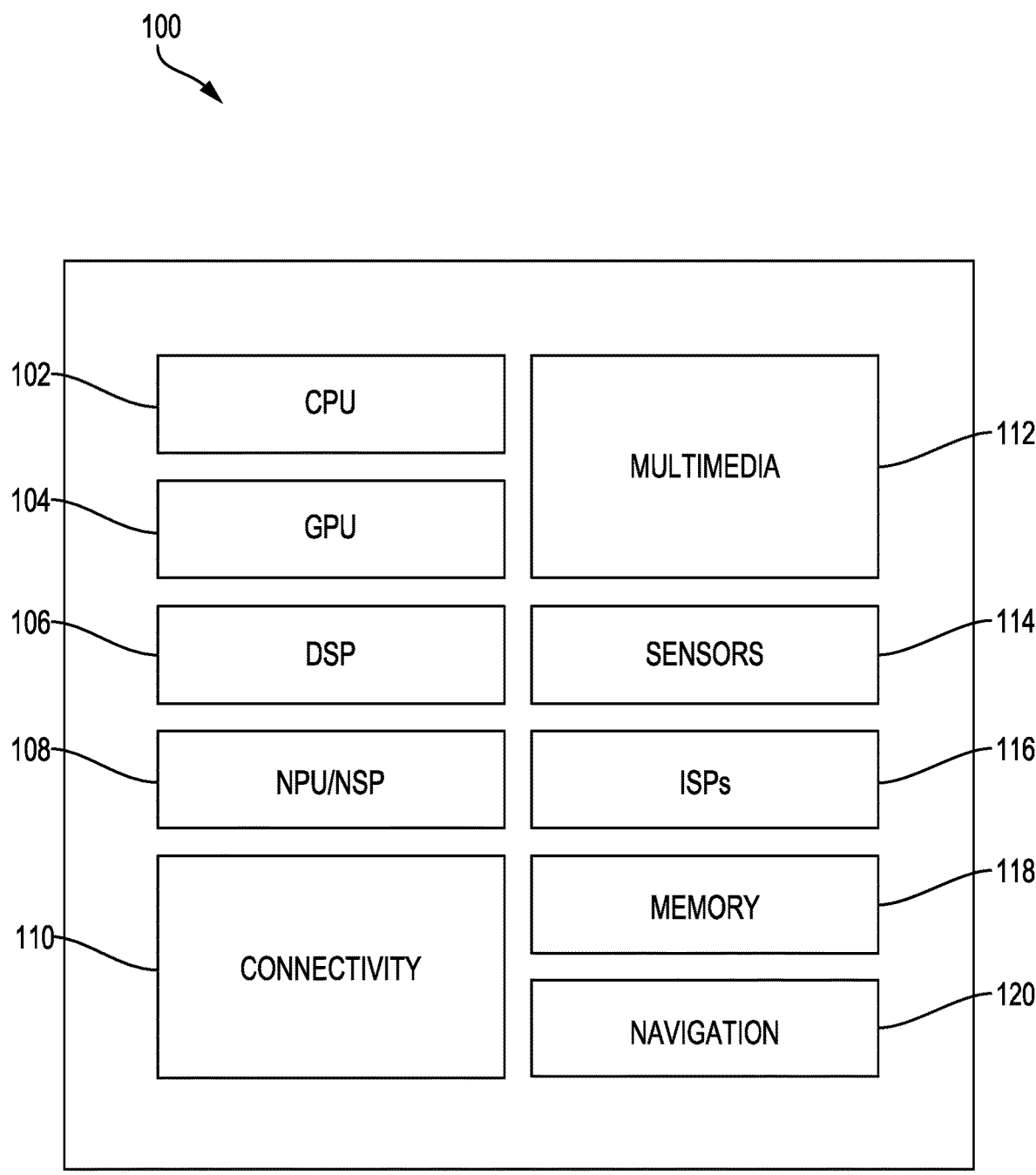
FIG. 1 illustrates an example implementation of a host system-on-chip (SoC), which is configured for execution unit sharing between processor cores, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form to avoid obscuring such concepts.

As described herein, the use of the term "and/or" is intended to represent an "inclusive OR," and the use of the term "or" is intended to represent an "exclusive OR." As described herein, the term "exemplary" used throughout this description means "serving as an example, instance, or illustration," and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations. It will be understood that the term "layer" includes film and is not construed as indicating a vertical or horizontal thickness unless otherwise stated. As described, the term "substrate" may refer to a substrate of a diced wafer or may refer to a substrate of a wafer that is not diced. Similarly, the terms "chip" and "die" may be used interchangeably.

Modern-day processors are equipped with multiple cores, which range from efficient, in-order-execution to super/hyper scalar architectures. The number of cores in these modern-day processors has steadily risen from approximately eight (8) processor cores in mobile processors to ninety-six (96) processor cores in server compute-platforms. Each processor core contains multiple integer processing units, floating point processing units, and load store units as part of their backend execution engine. During operation, some of the processor cores are under constant utilization while executing real-world applications, and some of the execution units are under constant utilization inside cores while executing the code of these real-world applications.

Execution of real-world applications involves reduced efficiency due to underutilization of processor cores and their associated execution units. Unfortunately, power efficient instructions for processor core execution are unavailable. Instead, processor core efficiency is realized from early completion of specified computations and reaching an idle state for clock gating and power gating. In practice, the extra time consumed by the active processor cores to complete a computation is inefficient when there are unutilized processor cores and partially used execution engines. A solution to this inefficiency by sharing of unused execution engines with active processor cores is desired.

Various aspects of the present disclosure are directed to a process of execution unit (EU) sharing between active processor cores. This EU sharing process includes encountering a structural hazard associated with an issued instruction in an instruction queue of a dispatch stage inside an active processor core. This EU sharing process also includes issuing a request for an idle EU of an inactive processor core. The EU sharing process further includes sending a transaction containing source operands of the issued instruction and a word address of a result buffer as a destination operand to an allocated EU of the inactive processor core. This EU sharing process completes by replacing the issued instruction in the instruction queue with a load operation to forward a result of the issued instruction from the result buffer based on the word address.

Various aspects of the present disclosure are directed to a process for an execution engine (EE) manager to support EU sharing operations between processor cores. The EE manager process includes monitoring a state of EUs in a cluster of processor cores. The EE manager process also includes receiving a request for an idle EU in the cluster of processor cores. The EE manager process further includes sending a control signal to activate an allocated EU of an inactive processor core. The EE manager process sends an EU acknowledgment and an EU identification (EU ID) to a dispatch stage of a requesting processor core.

FIG. 1 illustrates an example implementation of a host system-on-chip (SoC) 100, which is configured for execution unit sharing between processor cores, in accordance with aspects of the present disclosure. The host SoC 100 includes processing blocks tailored to specific functions, such as a connectivity block 110. The connectivity block 110 may include sixth generation (6G), connectivity fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU)/neural signal processor (NSP) 108. The host SoC 100 may also include a sensor processor 114, image signal processors (ISPs) 116, a navigation module 120, which may include a global positioning system, and a memory 118. The multi-core CPU 102, the GPU 104, the DSP 106, the NPU/NSP 108, and the multimedia engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU/NSP 108 may be based on an ARM instruction set.

The multi-core CPU 102 is equipped with multiple cores, which may range from efficient, in-order-execution to super/hyper scalar architectures. The number of cores in the multi-core CPU 102 may range from eight (8) processor cores in a mobile processor implementation to ninety-six (96) processor cores in a server compute-platform implementation of the host SoC 100. Each processor core of the multi-core CPU 102 contains multiple integer processing units, floating point processing units, and load store units as part of their backend execution engine. During operation, some of the processor cores of the multi-core CPU 102 are under constant utilization while executing real-world applications, and some of the execution units of the multi-core CPU 102 are under constant utilization inside cores while executing the code of these real-world applications.

Execution of real-world applications using the multi-core CPU 102 involves reduced efficiency due to underutilization of processor cores and their associated execution units. Unfortunately, power efficient instructions for processor core execution of the multi-core CPU 102 are unavailable.

Instead, processor core efficiency of the multi-core CPU 102 is realized from early completion of specified computations and reaching an idle state for clock gating and power gating. In practice, the extra time consumed by the active processor cores of the multi-core CPU 102 to complete a computation is inefficient when there are unutilized processor cores and partially used execution engines. A solution to this inefficiency by sharing of unused execution engines with active processor cores of the multi-core CPU 102 is desired.

Figure 2:
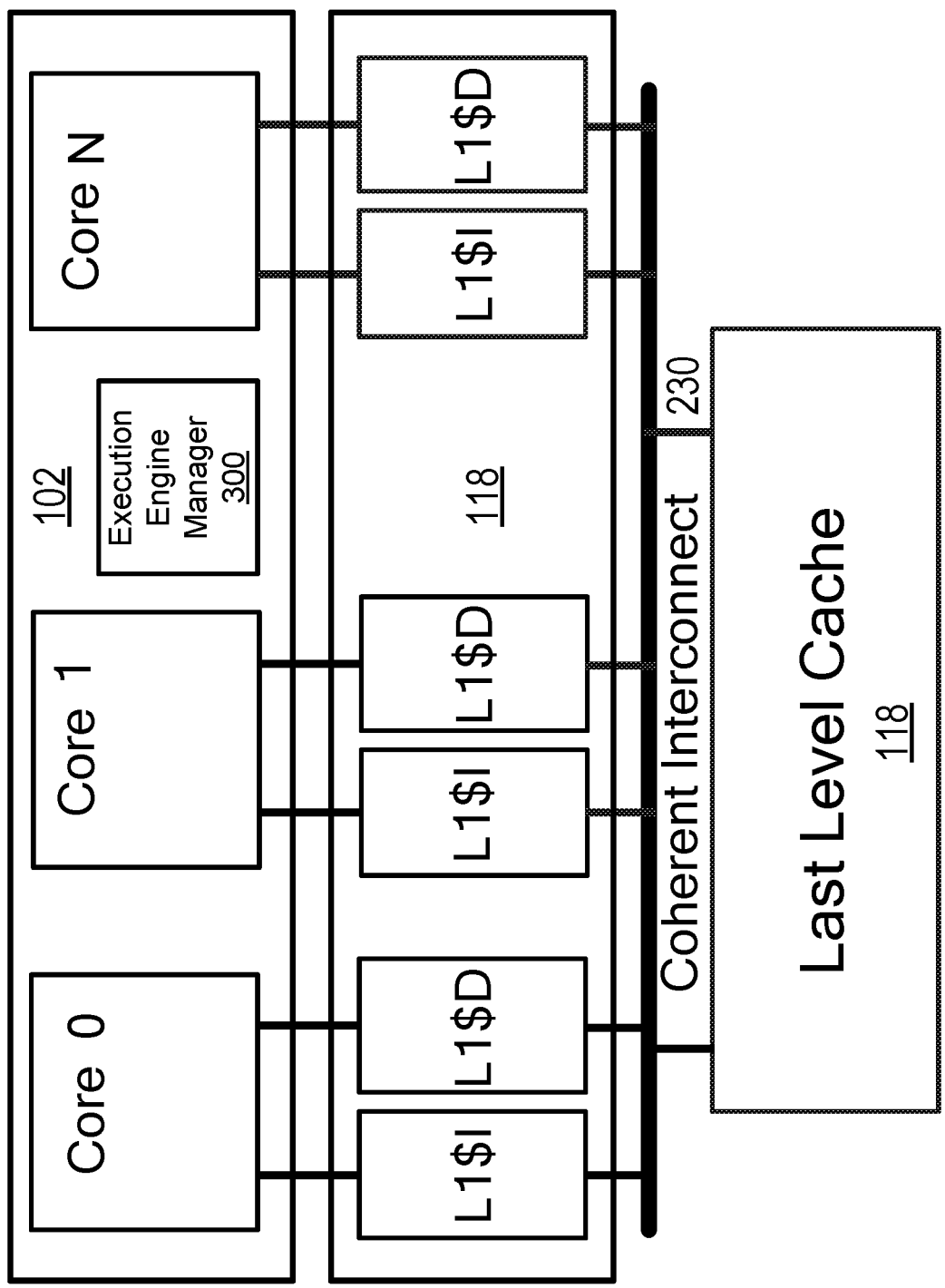
FIG. 2 is a circuit diagram further illustrating the system-on-chip (SoC) of FIG. 1, including an execution engine manager to support execution unit sharing operations between processor cores, according to various aspects of the present disclosure.

FIG. 2 is a circuit diagram further illustrating the system-on-chip (SoC) of FIG. 1, including an execution engine manager to support idle execution unit (EU) sharing operations between active processor cores, according to various aspects of the present disclosure. As shown in FIG. 2, an SoC 200 includes in the memory 118 (e.g., level-one (L1) cache and/or last level cache (LLC)) access through a coherent interconnect 230. In various aspects of the present disclosure, the SoC 200 is configured with a hardware-based, execution engine (EE) manager 300, in which idle EUs are shared between active processor cores. In this example, the EE manager 300 hardware is monitoring a state of EUs in a cluster of processor cores (e.g., Core 0, Core 1, . . . , Core N). In operation, the EE manager 300 hardware receives a request for an idle EU in the cluster of the processor cores of the multi-core CPU 102. In response, the EE manager 300 hardware sends a control signal to activate an allocated EU of an inactive processor core and also sends an EU acknowledgment and an EU identification (EU ID) to a dispatch stage of a requesting processor core, for example, as further illustrated in FIG. 3.

Figure 3:
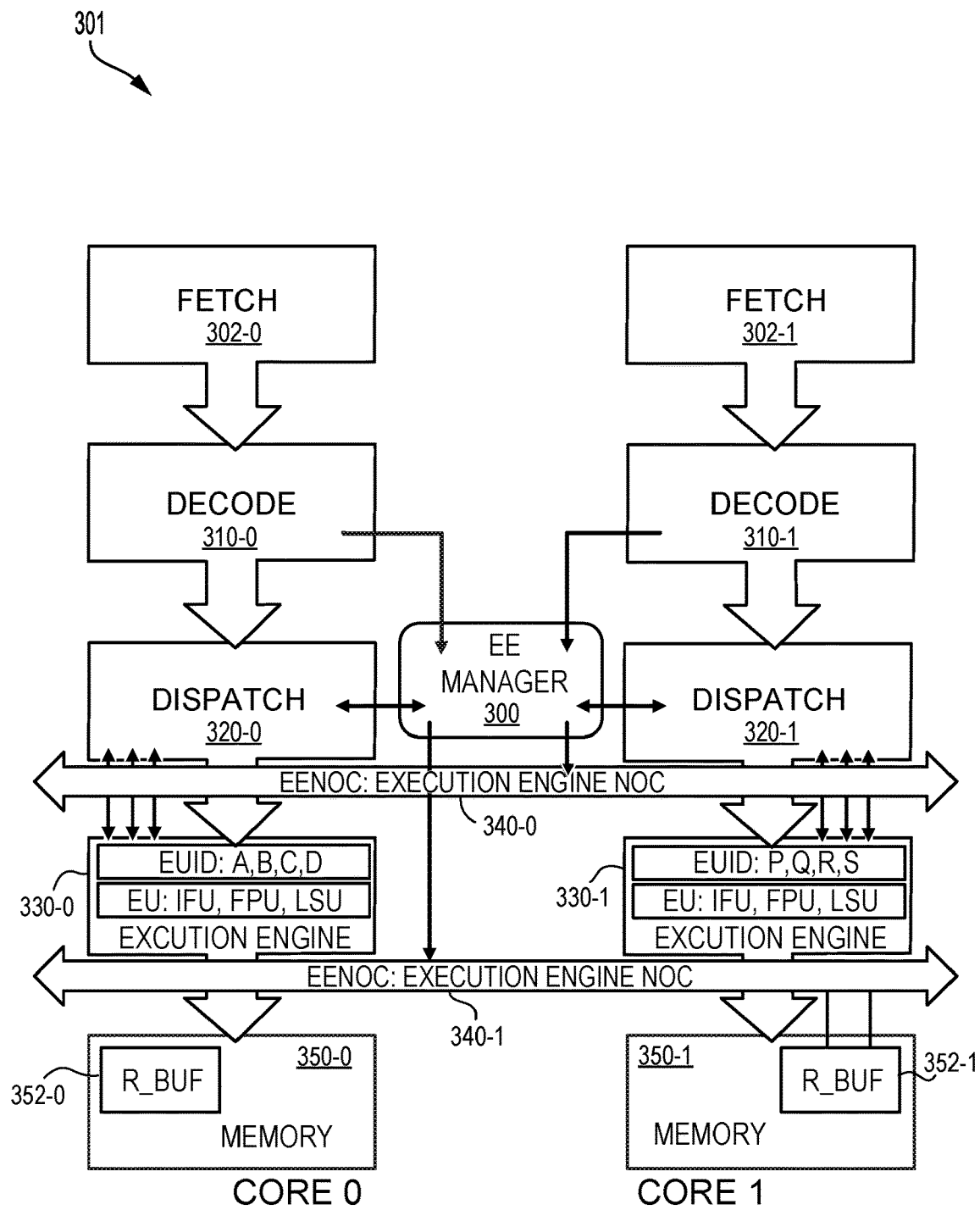
FIG. 3 is a block diagram further illustrating the system-on-chip (SoC) of FIG. 2, including an execution engine manager to support idle execution unit sharing operations between processor cores, according to various aspects of the present disclosure.

FIG. 3 is a block diagram further illustrating the system-on-chip (SoC) of FIG. 2, including an execution engine (EE) manager 300 to support idle execution unit (EU) sharing operations between processor cores, according to various aspects of the present disclosure. FIG. 3 illustrates a cluster of processor cores 301 (e.g., CORE 0 and CORE 1) of the SoC 200, including the EE manager 300, according to various aspects of the present disclosure. In practice, the cluster of processor cores 301 may contain any number of cores (e.g., two, four, six, eight, or X) with instruction set architecture (ISA) compatibility. In this example, the cluster of processor cores 301 is shown with two cores (e.g., CORE 0 and CORE 1), each containing a fetch stage 302 (302-0, 302-1), a decode stage 310 (310-0, 310-1), a dispatch stage 320 (320-0, 320-1), and an execution engine stage 330 (330-0, 330-1) in their respective pipelines. As shown in FIG. 3, high-performance cores in the cluster of processor cores 301 include high-performance EUs relative to power efficient cores of the cluster of processor cores 301.

Various aspects of the present disclosure are directed to an architectural solution that utilizes unused (e.g., idle) EUs from inactive cores in the cluster of processor cores 301. In these aspects of the present disclosure, an execution engine (EE) network-on-chip (NOC) (EE NOC) 340 (340-0, 340-1) and an EE manager 300 are implemented with the cluster of processor cores 301. In this configuration, the execution engine stage 330 in each core includes an integer processing unit (IPU), a floating-point unit (FPU), an arithmetic logic unit (ALU) and a load-store unit (LSU). In this example, the execution engine stage 330 includes execution unit (EU) identifications (EU IDs), such as EU IDs A. B. C. and D in the CORE 0 and EU IDs P. Q. R, and S in the CORE 1.

As shown in FIG. 3, a high bandwidth-high speed, EE NOC 340 is added at both ends of the execution engine stage 330. In operation, the EE NOC 340 carries instructions, data, power, and clock signals to/from allocated EUs. In various aspects of the present disclosure, the EE manager 300 monitors the cluster of processor cores 301, communicates with the EE NOC 340, the decode stage 310, the dispatch stage 320, and the execution engine stage 330 of each core in the cluster of processor cores 301.

In an active mode, the EE manager 300 maintains an active directory of idle EUs, including a current utilization status and a future utilization status of each EU of the execution engine stage 330 by monitoring the decoded instruction queue in the decode stage 310 and dependency chain information from the dispatch stage 320. In a reactive mode, the EE manager 300 collects the EU status on demand, when the dispatch stage 320 of the core issues a request for an extra EU. As described, EU activity status includes four types: busy, unused, clock-gated, and power-gated. As further illustrated in FIG. 3, a memory 350 (350-0, 350-1) is provided with a result buffer 352 (352-0, 352-1) to store results computed by an allocated EU, as further described in FIG. 4.

Figure 4:
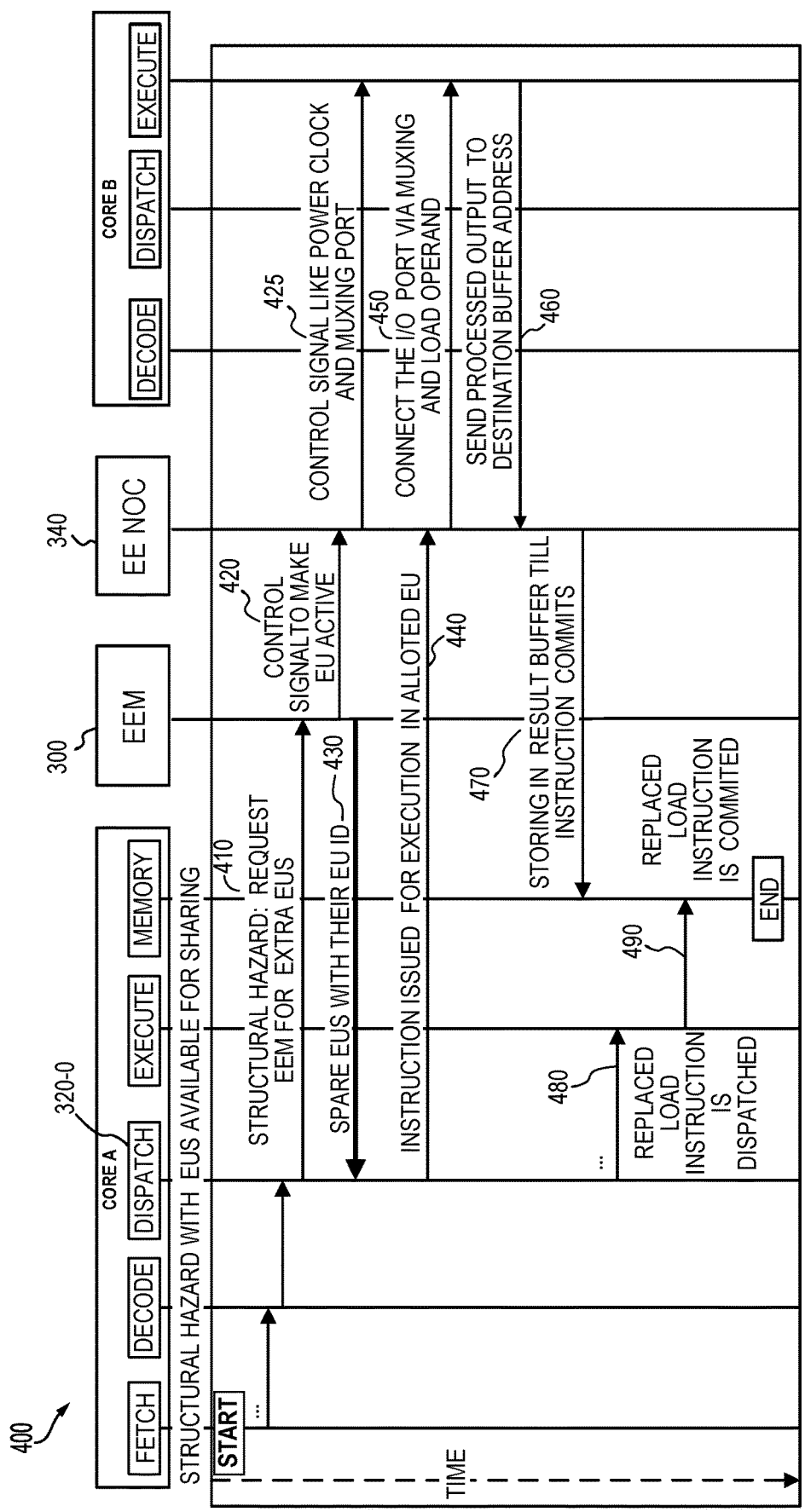
FIG. 4 is a timing diagram illustrating execution engine sharing between processor cores, according to various aspects of the present disclosure.

FIG. 4 is a timing diagram 400 illustrating execution engine sharing between processor cores (core A, core B), according to various aspects of the present disclosure. As shown in the timing diagram 400 FIG. 4, when a structural hazard is encountered in the instruction queue of the dispatch stage 320 inside an active core (core A), the dispatch stage 320 issues a request, at time 410, for a specified type of execution unit (EU). In response, the EE manager 300 checks for availability of the requested EU in the directory of the EE manager 300. In operation, if the requested EU is not available, the EE manager 300 sends a no allocation acknowledgement (ACK) to the dispatch stage 320. In this example, a requested EU is available in the cluster of processor cores 301. As a result, the EE manager 300 sends a control signal to the EE NOC 340, at time 420, to provide power to activate the EU. At time 425, the EE NOC 340 sends a control signal to a core B clock and transmitting multiplexer (MUX) coordinates to connect an input/output (IO) port of an allocated EU, based on a status of the allocated EU. Additionally, the EE manager 300 sends an allocated EU ACK, at time 430, including the EU ID of the allocated EU to the dispatch stage 320 of the requesting, active core A.

In response to receiving the ACK at time 430 for the allocated EU, the dispatch stage 320 sends a transaction packet to the EE NOC 340, at time 440, containing an issued instruction's source operands, and a result buffer word address as a destination operand for the allocated EU. Additionally, the dispatch stage 320 replaces the forwarded instruction with a simple load operation to forward the instruction's destination register for transferring a result to the destination register from the specified word address of the result buffer 352, as shown in FIG. 3.

In this example, the EE NOC 340 provides an interface to the allocated EU for unpacking the transaction packet, at time 440, received from the dispatch stage 320 and loads a result buffer 352 (see FIG. 3), with appropriate operands and engages the EU through an engagement signal, at time 450. In response, the allocated EU operates on the source operands and sends the processed result to a destination buffer address in a results signal, at time 460, which is stored by the EE NOC 340 in the result buffer 352 at the word address provided by the active core A. In this example, the dispatch stage 320 dispatches a replaced load instruction signal, at time 480, which causes the forwarded instruction to reach a commit stage, at time 490. Once the forwarded instruction reaches the commit stage, at time 470, in the pipeline of the active core A, the result is loaded to a destination register of the instruction using a commit signal, at time 490.

Figure 5:
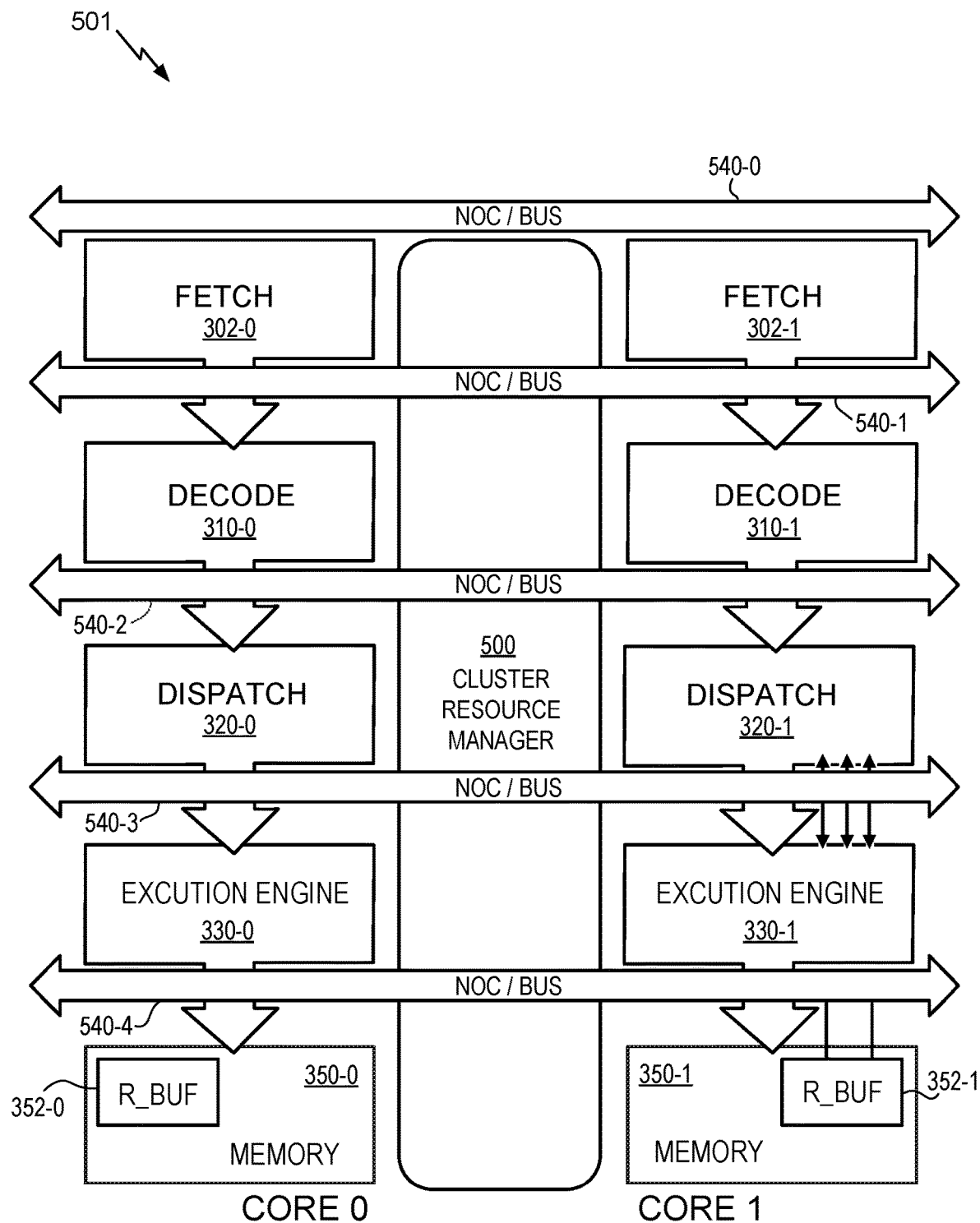
FIG. 5 is a block diagram further illustrating the system-on-chip (SoC) of FIG. 2, including the execution engine manager to support execution unit sharing operations between processor cores, according to various aspects of the present disclosure.

FIG. 5 is a block diagram further illustrating the system-on-chip (SoC) of FIG. 2, including the execution engine manager to support execution unit (EU) sharing operations between processor cores, according to various aspects of the present disclosure. As shown in FIG. 5, a cluster of processor cores 501 is similar to the cluster of processor cores 301 of FIG. 3 and described using similar reference numbers.

In FIG. 5, a network-on-chip/bus (NOC/BUS) 540 (540-0, 540-1, 540-2, 540-3, 540-4) is added to the fetch stage 302, the decode stage 310, the dispatch stage 320, and the execution engine stage 330 of FIG. 3. Additionally, a cluster resource manager 500 is provided to coordinate and allocate the pipeline stages from power gated cores. In various aspects of the present disclosure, when one core's pipeline stage reaches a structural hazard point (e.g., when two or more instructions in a processor core pipeline request access to the same resource), a request is issued to the cluster resource manager 500 for allocation of spare pipeline stages from other processor cores. If the requested stage is contextless, the stage can be allocated when the stage is not in use by other cores. If the requested stage is context-aware, then the stage can be allocated when the stage is power-gated in another core.

Sharing idle EUs with active processor cores beneficially makes efficient use of an available power and performance core, such as scalable vector extension and other binary agnostic extension EUs in the cluster of processor cores. Additionally, idle EU sharing provides higher performance because more EUs are available for active cores during execution. Idle EU sharing provides various performance benefits, such as a run-time reduction. Various aspects of the present disclosure utilize an idle EU of a processor core in a reset/power gated stage to execute a non-predicted path from a branch predictor. Executing both paths and committing the results from the taken path provides a flush-less pipeline execution. Additionally, idle EU sharing enables configuration of peak single core performance. For example, scalable vector extension can run at much wider register lengths by using all available scalable vector extension units.

The inclusion of the NOC/BUS 540 and the cluster resource manager 500 at each pipeline stage comes with area overhead. The additional infrastructure can be offloaded to a top-level die in a 3D integrated circuit (IC) packaging configuration, in addition to the 3D vertical caches in that layer. Hence, inclusion of the NOC/BUS 540 and the cluster resource manager 500 at each pipeline stage provides an opportunity to dynamically reconfigure the single core capability. This fluid nature of configuring any core's stage with one another can lead to effective utilizations of pipelines in the cluster. Multiple front ends can feed a single execution engine in applications that are frontend stalled or multiple execution engines served by a single core's frontend forming dynamic pipelines that try to complete execution by shared EUs. A process for idle EU sharing may be performed, for example, as shown in FIG. 6.

Figure 6:
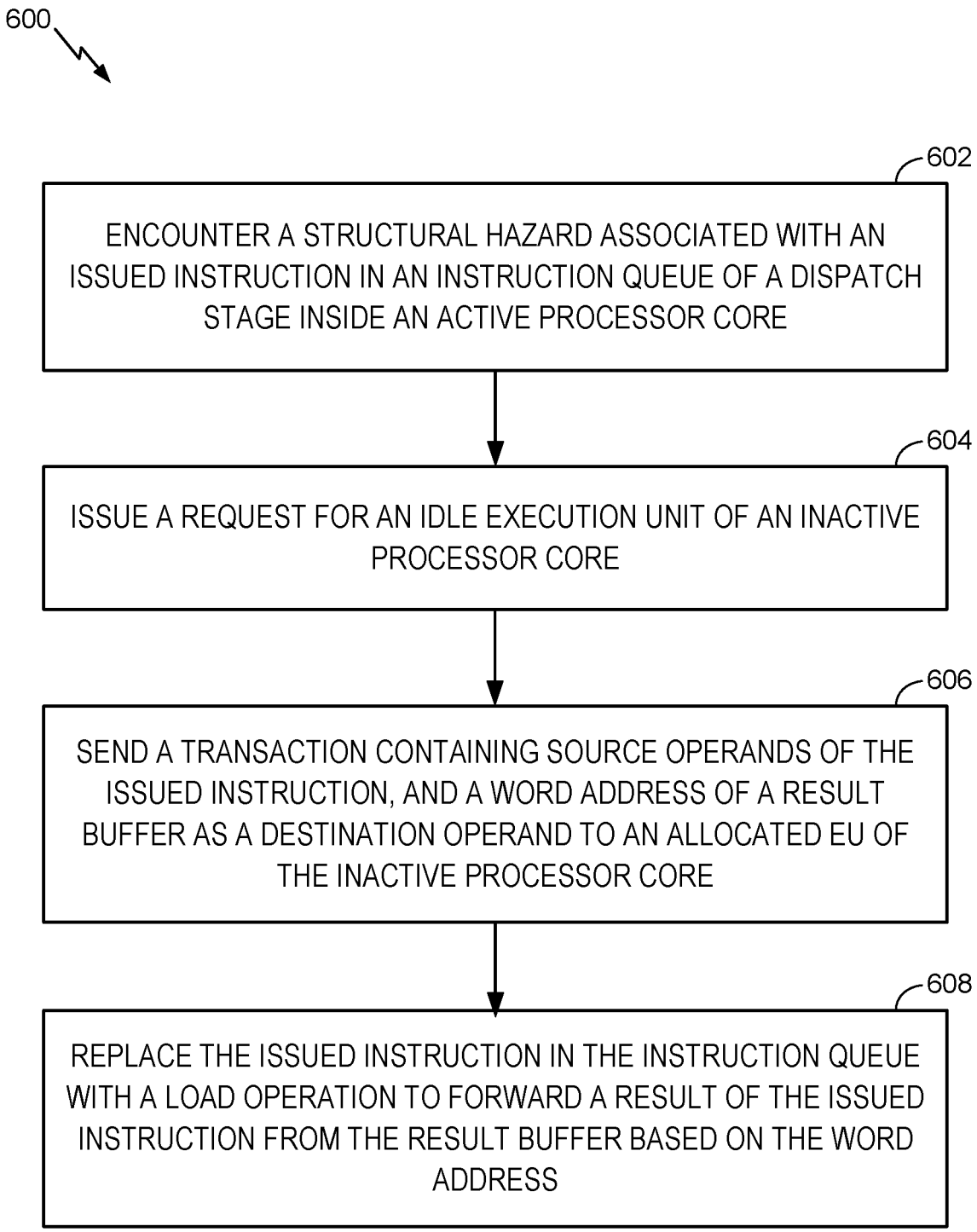
FIG. 6 is a process flow diagram illustrating a method for execution engine (EE) sharing between processor cores, according to various aspects of the present disclosure.

FIG. 6 is a process flow diagram illustrating a method for execution engine (EE) sharing between processor cores, according to various aspects of the present disclosure. A method 600 begins at block 602, in which a structural hazard is encountered that is associated with an issued instruction in an instruction queue of a dispatch stage inside an active processor core. For example, as shown in the timing diagram 400 FIG. 4, a structural hazard is encountered in the instruction queue of the dispatch stage 320 inside an active core (core A). In various aspects of the present disclosure, when one core's pipeline stage reaches a structural hazard point (e.g., when two or more instructions in a processor core pipeline request access to the same resource), a request is issued to the cluster resource manager 500 for allocation of spare pipeline stages from other processor cores. If the requested stage is contextless, the stage can be allocated when the stage is not in use by other cores. If the requested stage is context-aware, then the stage can be allocated when the stage is power-gated in another core.

At block 604, a request is issued for an idle execution unit of an inactive processor core. For example, in the timing diagram 400 FIG. 4, when a structural hazard is encountered in the instruction queue of the dispatch stage 320 inside an active core (core A), the dispatch stage 320 issues a request, at time 410, for a specified type of execution unit (EU).

At block 606, a transaction is sent containing source operands of the issued instruction, and a word address of a result buffer as a destination operand to an allocated EU of the inactive processor core. For example, as shown in FIG. 4, the EE manager 300 sends a control signal to the EE NOC 340, at time 420, to provide power to activate the EU. At time 425, the EE NOC 340 sends a control signal to a core B clock and transmitting multiplexer (MUX) coordinates to connect an input/output (IO) port of an allocated EU, based on a status of the allocated EU. Additionally, the EE manager 300 sends an allocated EU ACK, at time 430, including the EU ID of the allocated EU to the dispatch stage 320 of the requesting, active core A.

At block 608, the issued instruction is replaced in the instruction queue with a load operation to forward a result of the issued instruction from the result buffer based on the word address. For example, as shown in FIG. 4, the allocated EU operates on the source operands and sends the processed result to a destination buffer address in a results signal, at time 460, which is stored by the EE NOC 340 in the result buffer 352 at the word address provided by the active core A. In this example, the dispatch stage 320 dispatches a replaced load instruction signal, at time 480, which causes the forwarded instruction to reach a commit stage, at time 490. Once the forwarded instruction reaches the commit stage, at time 470, in the pipeline of the active core A, the result is loaded to a destination register of the instruction using a commit signal, at time 490.

In some aspects, the method 600 may be performed by the host SoC 100 (FIG. 1). That is, each of the elements of method 600 may, for example, but without limitation, be performed by the host SoC 100 or one or more processors (e.g., multi-core CPU 102 and/or NPU 130) and/or other components included therein.

Figure 7:
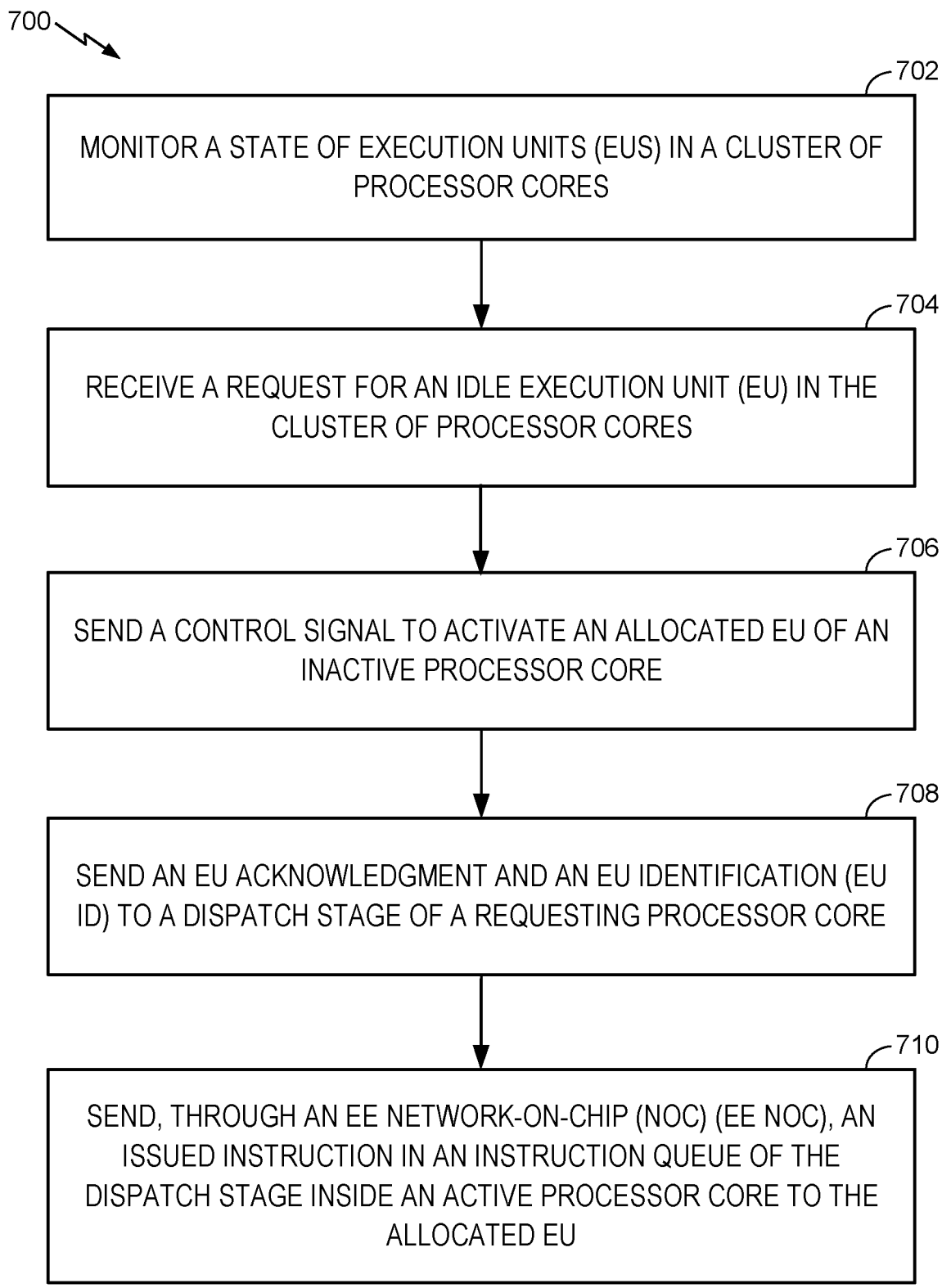
FIG. 7 is a process flow diagram illustrating a method for an execution engine (EE) manager to support processor cores, according to various aspects of the present disclosure.

FIG. 7 is a process flow diagram illustrating a method for an execution engine (EE) manager to support processor cores, according to various aspects of the present disclosure. A method 700 begins at block 702, in which a state of execution units (EUs) in a cluster of processor cores are monitored. For example, as shown in FIG. 3, in an active mode, the EE manager 300 maintains an active directory of idle EUs, including a current utilization status and a future utilization status of each EU of the execution engine stage 330 by monitoring the decoded instruction queue in the decode stage 310 and dependency chain information from the dispatch stage 320. In a reactive mode, the EE manager 300 collects the EU status on demand, when the dispatch stage 320 of the core issues a request for an extra EU.

At block 704, a request is received for an idle execution unit (EU) in the cluster of processor cores. For example, in the timing diagram 400 FIG. 4, when a structural hazard is encountered in the instruction queue of the dispatch stage 320 inside an active core (core A), the dispatch stage 320 issues a request, at time 410, for a specified type of execution unit (EU).

At block 706, a control signal is sent to activate an allocated EU of an inactive processor core. For example, as shown in FIG. 4, the EE manager 300 sends a control signal to the EE NOC 340, at time 420, to provide power to activate the EU. At block 708, an EU acknowledgment and an EU identification (EU ID) are sent to a dispatch stage of a requesting processor core. For example, as shown in FIG. 4, at time 425, the EE NOC 340 sends a control signal to a core B clock and transmitting multiplexer (MUX) coordinates to connect an input/output (IO) port of an allocated EU, based on a status of the allocated EU. Additionally, the EE manager 300 sends an allocated EU ACK, at time 430, including the EU ID of the allocated EU to the dispatch stage 320 of the requesting, active core A.

At block 710, an EE network-on-chip (NOC) (EE NOC) sends an issued instruction in an instruction queue of the dispatch stage inside an active processor core to the allocated EU. For example, as shown in FIG. 4, the EE NOC 340 provides an interface to the allocated EU for unpacking the transaction packet, at time 440, received from the dispatch stage 320 and loads a result buffer 352 (see FIG. 3), with appropriate operands and engages the EU through an engagement signal, at time 450. In response, the allocated EU operates on the source operands and sends the processed result to a destination buffer address in a results signal, at time 460, which is stored by the EE NOC 340 in the result buffer 352 at the word address provided by the active core A.

Figure 8:
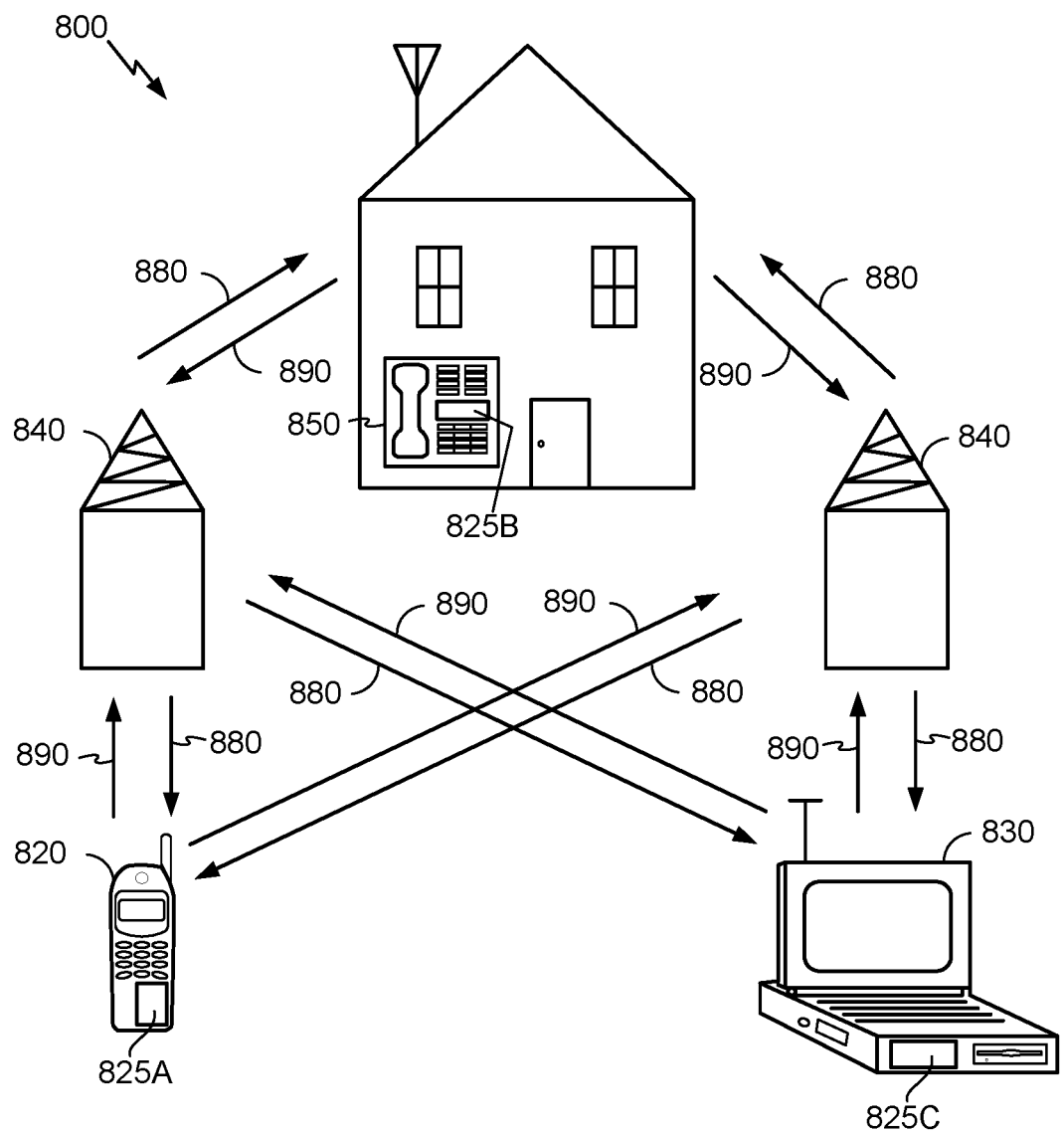
FIG. 8 is a block diagram showing an exemplary wireless communications system in which a configuration of the disclosure may be advantageously employed.

FIG. 8 is a block diagram showing an exemplary wireless communications system 800 in which an aspect of the disclosure may be advantageously employed. For purposes of illustration, FIG. 8 shows three remote units 820, 830, and 850, and two base stations 840. It will be recognized that wireless communications systems may have many more remote units and base stations. Remote units 820, 830, and 850 include IC devices 825A, 825B, and 825C that include the disclosed execution unit sharing operation. It will be recognized that other devices may also include the disclosed execution unit sharing operation, such as the base stations, switching devices, and network equipment. FIG. 7 shows forward link signals 880 from the base stations 840 to the remote units 820, 830, and 850, and reverse link signals 890 from the remote units 820, 830, and 850 to base stations 840.

In FIG. 8, remote unit 820 is shown as a mobile telephone, remote unit 830 is shown as a portable computer, and remote unit 850 is shown as a fixed location remote unit in a wireless local loop system. For example, the remote units may be a mobile phone, a hand-held personal communications systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 8 illustrates remote units according to aspects of the present disclosure, the disclosure is not limited to these exemplary illustrated units. Aspects of the present disclosure may be suitably employed in many devices, which include the disclosed execution unit sharing operation.

Figure 9:
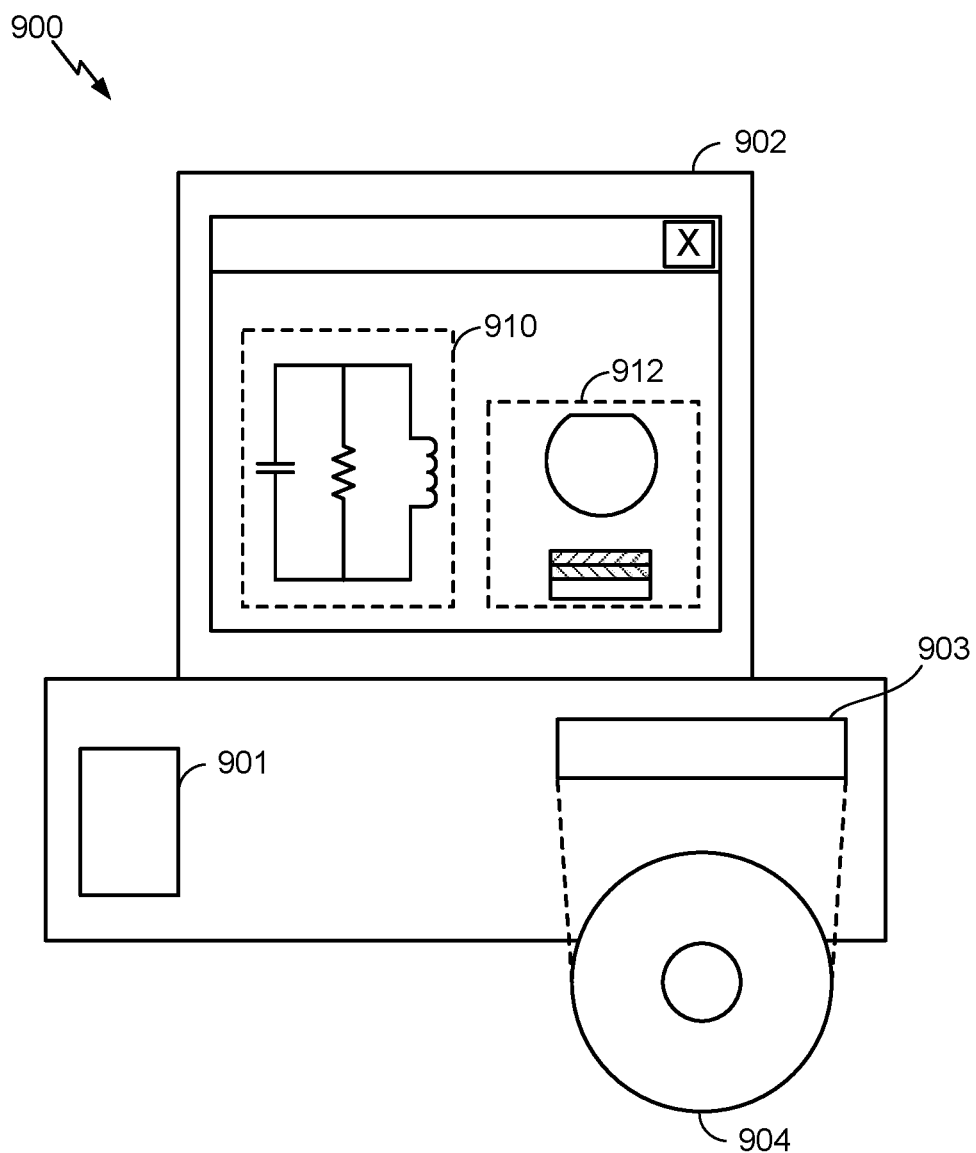
FIG. 9 is a block diagram illustrating a design workstation used for circuit, layout, and logic design of a semiconductor component according to one configuration.

FIG. 9 is a block diagram illustrating a design workstation used for circuit, layout, and logic design of a semiconductor component, such as the execution engine (EE) manager of the execution unit sharing operation disclosed above. A design workstation 900 includes a hard disk 901 containing operating system software, support files, and design software such as Cadence or OrCAD. The design workstation 900 also includes a display 902 to facilitate design of a circuit 910 or an integrated circuit (IC) component 912 such as the EE manager. A storage medium 904 is provided for tangibly storing the design of the circuit 910 or the IC component 912 (e.g., the EE manager of the execution unit sharing operation). The design of the circuit 910 or the IC component 912 may be stored on the storage medium 904 in a file format such as GDSII or GERBER. The storage medium 904 may be a CD-ROM, DVD, hard disk, flash memory, or other appropriate device. Furthermore, the design workstation 900 includes a drive apparatus 903 for accepting input from or writing output to the storage medium 904.

Data recorded on the storage medium 904 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 904 facilitates the design of the circuit 910 or the IC component 912 by decreasing the number of processes for designing semiconductor wafers.

Implementation examples are described in the following numbered clauses:

1. A method of execution unit (EU) sharing between processor cores, the method comprising:
   encountering a structural hazard associated with an issued instruction in an instruction queue of a dispatch stage inside an active processor core;
   issuing a request for an idle execution unit of an inactive processor core;
   sending a transaction containing source operands of the issued instruction, and a word address of a result buffer as a destination operand to an allocated EU of the inactive processor core; and
   replacing the issued instruction in the instruction queue with a load operation to forward a result of the issued instruction from the result buffer based on the word address.

2. The method of clause 1, further comprising receiving an EU acknowledgment and an EU identification (EU ID) at the dispatch stage of a requesting processor core.

3. The method of any of clauses 1 or 2, further comprising storing the result in a register according to the word address to commit the instruction.

4. The method of any of clauses 1-3, in which sending the transaction comprises issuing the issued instruction for execution to the allocated EU of the inactive processor core.

5. The method of any of clauses 1-4, in which encountering comprises:
   detecting the issued instruction, requiring access to a same hardware resource as a previously issued instruction; and
   replacing the issued instruction in the instruction queue with the load operation.

6. The method of any of clauses 1-5, further comprising sending a control signal to activate the allocated EU prior to sending the transaction containing the source operands.

7. The method of clause 6, in which the control signal includes instructions, data, power and clock signals to/from allocated execution units.

8. The method of any of clauses 1-7, further comprising connecting an input/output (IO) port of the allocated EU to an execution engine (EE) network-on-chip (NOC) (EE NOC).

9. The method of any of clauses 1-8, further comprising receiving a no allocation acknowledgement (ACK) when an idle EU is unavailable.

10. A method for an execution engine (EE) manager to support processor cores, the method comprising:
   monitoring a state of execution units (EUs) in a cluster of processor cores;
   receiving a request for an idle execution unit (EU) in the cluster of processor cores;
   sending a control signal to activate an allocated EU of an inactive processor core;
   sending an EU acknowledgment and an EU identification (EU ID) to a dispatch stage of a requesting processor core; and
   sending, through an EE network-on-chip (NOC) (EE NOC), an issued instruction in an instruction queue of the dispatch stage inside an active processor core to the allocated EU.

11. The method of clause 10, in receiving the request the further comprises:
   identifying the idle EU of the inactive processor core from a directory of idle EUs in the cluster of processor cores; and
   allocating the idle EU of the inactive processor core as the allocated EU.

12. The method of any of clauses 10 or 11, further sending a no allocation acknowledgement (ACK) to the dispatch stage of the requesting processor core if an idle EU from the cluster of processor cores is not available.

13. The method of any of clauses 10-12, further comprising:
   executing, by the allocated EU, the issued instruction to generate a result; and
   sending the result to a destination buffer address.

14. The method of clause 13, further comprising deactivating the allocated EU after sending the result to the destination buffer address.

15. The method of any of clauses 10-14, in which sending the control signal comprises transmitting multiplexer (MUX) coordinates to connect an input/output (IO) port of the allocated EU of the inactive processor core.

16. The method of any of clauses 10-15, further comprising storing a result from the allocated EU, after execution of the issued instruction in a result buffer until the issued instruction is committed.

17. The method of any of clauses 10-16, in which the control signal includes power and a clock signals for the allocated EU.

18. The method of any of clauses 10-17, further comprising connecting an input/output (IO) port of the allocated EU to the execution engine (EE) network-on-chip (NOC) (EE NOC).

19. The method of any of clauses 10-18, in which sending the issued instruction further comprises:
   receiving a transaction containing source operands of the issued instruction, and a word address of a result buffer as a destination operand; and
   transmitting the transaction to the allocated EU of the inactive processor core.

20. The method of any of clauses 10-19, in which monitoring comprises:
   detecting the idle EU in the cluster of processor cores; and
   adding the idle EU to a directory of idle EUs in the cluster of processor cores.

For a firmware and/or software implementation, the methodologies may be implemented with modules (e.g., procedures, functions, etc.) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer. Disk and disc, as used herein, include compact disc (CD), laser disc, optical disc, digital versatile disc (DVD), floppy disk and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, various changes, substitutions, and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above, and below may refer to sides of a substrate or electronic device. Moreover, the scope of the present application is not intended to be limited to the configurations of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed that perform the same function or achieve the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of execution unit (EU) sharing between processor cores, the method comprising:
   encountering a structural hazard associated with an issued instruction in an instruction queue of a dispatch stage inside an active processor core;
   issuing a request for an idle execution unit of an inactive processor core;
   sending a transaction containing source operands of the issued instruction, and a word address of a result buffer as a destination operand to an allocated EU of the inactive processor core; and
   replacing the issued instruction in the instruction queue with a load operation to forward a result of the issued instruction from the result buffer based on the word address.

2. The method of claim 1, further comprising receiving an EU acknowledgment and an EU identification (EU ID) at the dispatch stage of a requesting processor core.

3. The method of claim 1, further comprising storing the result in a register according to the word address to commit the instruction.

4. The method of claim 1, in which sending the transaction comprises issuing the issued instruction for execution to the allocated EU of the inactive processor core.

5. The method of claim 1, in which encountering comprises:
   detecting the issued instruction, requiring access to a same hardware resource as a previously issued instruction; and
   replacing the issued instruction in the instruction queue with the load operation.

6. The method of claim 1, further comprising sending a control signal to activate the allocated EU prior to sending the transaction containing the source operands.

7. The method of claim 6, in which the control signal includes instructions, data, power and clock signals to/from allocated execution units.

8. The method of claim 1, further comprising connecting an input/output (IO) port of the allocated EU to an execution engine (EE) network-on-chip (NOC) (EE NOC).

9. The method of claim 1, further comprising receiving a no allocation acknowledgement (ACK) when an idle EU is unavailable.

10. A method for an execution engine (EE) manager to support processor cores, the method comprising:
    monitoring a state of execution units (EUs) in a cluster of processor cores;
    receiving a request for an idle execution unit (EU) in the cluster of processor cores;
    sending a control signal to activate an allocated EU of an inactive processor core;
    sending an EU acknowledgment and an EU identification (EU ID) to a dispatch stage of a requesting processor core; and
    sending, through an EE network-on-chip (NOC) (EE NOC), an issued instruction in an instruction queue of the dispatch stage inside an active processor core to the allocated EU.

11. The method of claim 10, in receiving the request the further comprises:
    identifying the idle EU of the inactive processor core from a directory of idle EUs in the cluster of processor cores; and
    allocating the idle EU of the inactive processor core as the allocated EU.

12. The method of claim 10, further sending a no allocation acknowledgement (ACK) to the dispatch stage of the requesting processor core if an idle EU from the cluster of processor cores is not available.

13. The method of claim 10, further comprising:
    executing, by the allocated EU, the issued instruction to generate a result; and
    sending the result to a destination buffer address.

14. The method of claim 13, further comprising deactivating the allocated EU after sending the result to the destination buffer address.

15. The method of claim 10, in which sending the control signal comprises transmitting multiplexer (MUX) coordinates to connect an input/output (IO) port of the allocated EU of the inactive processor core.

16. The method of claim 10, further comprising storing a result from the allocated EU, after execution of the issued instruction in a result buffer until the issued instruction is committed.

17. The method of claim 10, in which the control signal includes power and a clock signals for the allocated EU.

18. The method of claim 10, further comprising connecting an input/output (IO) port of the allocated EU to the execution engine (EE) network-on-chip (NOC) (EE NOC).

19. The method of claim 10, in which sending the issued instruction further comprises:
    receiving a transaction containing source operands of the issued instruction, and a word address of a result buffer as a destination operand; and
    transmitting the transaction to the allocated EU of the inactive processor core.

20. The method of claim 10, in which monitoring comprises:
    detecting the idle EU in the cluster of processor cores; and
    adding the idle EU to a directory of idle EUs in the cluster of processor cores.

* * * * *